United States Patent
Huang et al.

(10) Patent No.: US 8,941,780 B2
(45) Date of Patent: Jan. 27, 2015

(54) MECHANISM FOR FACILITATING DYNAMIC PHASE DETECTION WITH HIGH JITTER TOLERANCE FOR IMAGES OF MEDIA STREAMS

(71) Applicant: Silicon Image, Inc., Sunnyvale, CA (US)

(72) Inventors: Jiong Huang, Sunnyvale, CA (US); Yuan Chen, Shanghai (CN); Tieshan Liu, Shanghai (CN); Lianghai Li, Shanghai (CN); Bing Zhang, Shanghai (CN); Jian Zhu, Shanghai (CN)

(73) Assignee: Silicon Image, Inc., Sunnyvale, CA (US)

( * ) Notice: Subject to any disclaimer, the term of this patent is extended or adjusted under 35 U.S.C. 154(b) by 0 days.

(21) Appl. No.: 14/115,324

(22) PCT Filed: Jan. 22, 2013

(86) PCT No.: PCT/CN2013/070826
§ 371 (c)(1),
(2) Date: Nov. 1, 2013

(87) PCT Pub. No.: WO2014/113915
PCT Pub. Date: Jul. 31, 2014

(65) Prior Publication Data
US 2014/0204222 A1  Jul. 24, 2014

(51) Int. Cl.
*H04N 7/00* (2011.01)
*H04N 17/00* (2006.01)
(52) U.S. Cl.
CPC ..................... *H04N 17/00* (2013.01)
USPC ....................................................... 348/497

(58) Field of Classification Search
USPC ......... 348/194, 180, 189, 552, 553, 687, 688, 348/192, 184, 497, 498; 382/263, 276, 254, 382/266–268, 274
See application file for complete search history.

(56) References Cited

U.S. PATENT DOCUMENTS

| | | | |
|---|---|---|---|
| 6,529,613 B1 * | 3/2003 | Astle | 382/103 |
| 6,587,084 B1 * | 7/2003 | Alymov et al. | 345/60 |
| 6,798,919 B2 * | 9/2004 | Ali et al. | 382/272 |
| 6,876,381 B2 * | 4/2005 | Van Zon | 348/180 |
| 7,023,470 B2 * | 4/2006 | Braun | 348/180 |

(Continued)

FOREIGN PATENT DOCUMENTS

| | | |
|---|---|---|
| CN | 102520404 | 6/2012 |
| CN | 102708567 | 10/2012 |
| EP | 2535863 | 12/2012 |

OTHER PUBLICATIONS

International Search Report PCT/CN2013/070826, mailing date Oct. 31, 2013, 9 pages.

*Primary Examiner* — Paulos M Natnael
(74) *Attorney, Agent, or Firm* — Fenwick & West LLP

(57) ABSTRACT

A mechanism for facilitating dynamic phase detection with high jitter tolerance for images of media streams is described. In one embodiment, a method includes calculating stability optimization of an image of a media stream based on a plurality of pixels of two or more consecutive frames relating to a plurality of phases of the image, calculating sharpness optimization of the image, and selecting a best phase of the plurality of phases based on the stability and sharpness optimization of the image. The best phase may represent the image such that the image is displayed in a manner in accordance with human vision perceptions.

20 Claims, 6 Drawing Sheets

(56) References Cited

U.S. PATENT DOCUMENTS

| | | | |
|---|---|---|---|
| 7,050,097 B2* | 5/2006 | Schick et al. | 348/239 |
| 7,973,740 B2* | 7/2011 | Masutani et al. | 345/58 |
| 8,126,197 B2* | 2/2012 | Jones et al. | 382/100 |
| 2006/0033936 A1* | 2/2006 | Lee et al. | 358/1.2 |
| 2006/0257048 A1* | 11/2006 | Lin et al. | 382/276 |
| 2007/0216802 A1* | 9/2007 | Kondo et al. | 348/452 |
| 2010/0054705 A1* | 3/2010 | Okamoto et al. | 386/95 |
| 2010/0080451 A1* | 4/2010 | Nagano et al. | 382/159 |
| 2010/0254451 A1* | 10/2010 | Melnyk et al. | 375/240.03 |
| 2012/0212627 A1* | 8/2012 | Klose | 348/189 |
| 2012/0321214 A1* | 12/2012 | Hosokawa et al. | 382/263 |
| 2014/0085493 A1* | 3/2014 | Petrescu et al. | 348/208.1 |

* cited by examiner

MECHANISM FOR FACILITATING DYNAMIC PHASE DETECTION WITH HIGH JITTER TOLERANCE FOR IMAGES OF MEDIA STREAMS

CROSS-REFERENCE TO RELATED APPLICATIONS

This patent application is a U.S. National Phase Application under 35 U.S.C. §371 of International Application No. PCT/CN2013/070826, filed Jan. 22, 2013, entitled MECHANISM FOR FACILITATING DYNAMIC PHASE DETECTION WITH HIGH JITTER TOLERANCE FOR IMAGES OF MEDIA STREAMS, and the benefit and priority are claimed thereof

FIELD

Embodiments of the invention generally relate to media communication and, more particularly, to a mechanism for facilitating dynamic phase detection with high jitter tolerance for images of media streams.

BACKGROUND

With digitization of electronic devices, such as increasing number of televisions having High-Definition Multimedia Interface (HDMI) and Mobile High-Definition Link (MHL) connectors, it is common to convert analog signals to digital signals to remove analog connectors and improve picture quality. However, such computer-generated images are low-quality and unintelligent as they do not take into account any number of critical factors.

SUMMARY

A mechanism for facilitating dynamic phase detection with high jitter tolerance for images of media streams is described.

In one embodiment, a method includes calculating stability optimization of an image of a media stream based on a plurality of pixels of two or more consecutive frames relating to a plurality of phases of the image, calculating sharpness optimization of the image, and selecting a best phase of the plurality of phases based on the stability and sharpness optimization of the image. The best phase may represent the image such that the image is displayed in a manner in accordance with human vision perceptions.

In another embodiment, an apparatus performs a method according to any one or more of the operations mentioned above.

In another embodiment, a system includes one or more devices performing a method according to any one or more of the operations mentioned above.

In yet another embodiment, at least one machine-readable medium comprising a plurality of instructions that in response to being executed on a computing device, causes the computing device to carry out a method according to any one or more of the operations mentioned above.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are directed to facilitating automatic phase detection with high jitter tolerance for images of media streams.

Figure 1:
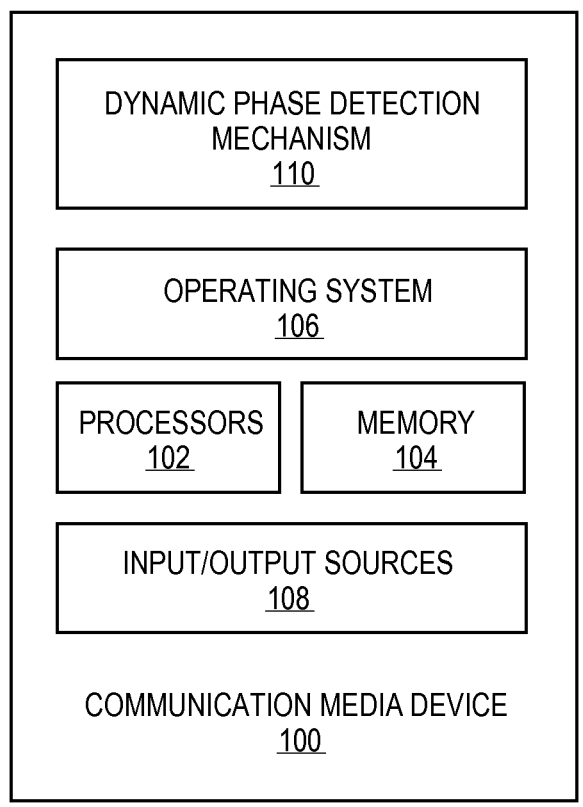
FIG. 1 illustrates a media device employing a dynamic phase detection mechanism according to one embodiment.

FIG. 1 illustrates a media device employing a dynamic phase detection mechanism 110 according to one embodiment. Communication or network media device 100 may include any number and type of media devices, such as a source device (e.g., a transmitter), a sink device (e.g., a receiver), an intermediate device (e.g., an analog-digital convertor), an amplifier, etc. Communication media device 100 may include any number of components and/or modules that may be common to a variety of media devices (such as a sink device, a source device, etc.); however, throughout this document and particularly with reference to FIG. 2, in one embodiment and for brevity, clarity and ease of understanding, communication media device 100 may include and be referred to as a host device or host machine employing dynamic phase detection mechanism ("phase mechanism") 110 and set to be in communication with any number and type of devices, such as one or more source devices and/or sink device and/or intermediate devices over a network (e.g., a broadcasting network, such a cable or satellite broadcasting network, a Wide Area Network (WAN), a Local Area Network (LAN), a Personal Area Network (PAN), a Metropolitan Area Network (MAN), a cloud-based network, an intranet, the Internet, etc.).

A source device refers to a transmitter or a transmitting device that is responsible for transmitting data (e.g., media audio and/or video data/content streams) to a sink device that refers to a receiver or a receiving device responsible for receiving the transmitted data over a communication network. Examples of a source device may include consumer electronics devices, such as a personal computer ("PC"), a mobile computing device (e.g., a tablet computer, a smartphone, etc.), an MP3 player, an audio equipment, a television, a radio, a Global Positioning System ("GPS") or navigation device, a digital camera, an audio/video recorder, a Blu-Ray player, a Digital Versatile Disk ("DVD") player, a Compact Disk ("CD") player, a Video Cassette Recorder ("VCR"), a camcorder, etc. Examples of a source device may further include a computing device, a data terminal, a machine (e.g., a facsimile machine, a telephone, etc.), a video camera, a broadcasting station (e.g., a television or radio station, a cable headend, etc.), a cable broadcasting headend, a set-top box, a satellite, etc. A sink device may include one or more of the same examples of media devices as those listed for the source device. Similarly, an intermediate device may include one or more of the same media device as those listed for the source device or it may include a specialized convertor device to facilitate conversion of the media from one form to another, such as from analog to digital or vice versa.

Communication media device 100 may include an operating system 106 serving as an interface between any hardware or physical resources of the source device 100 and a sink device or a user. Communication media device 100 may further include one or more processors 102, memory devices 104, network devices, drivers, or the like, as well as input/output ("I/O") sources 108, such as a touchscreen, a touch panel, a touch pad, a virtual or regular keyboard, a virtual or regular mouse, etc.

Embodiments provide phase mechanism 110 to facilitate an internal phase-locked loop or phase lock loop (PLL) to dynamically generate a target pixel clock for analog to digital conversion (ADC) and using the pixel clock to search for a phase that can be used to generate images that are of quality that is preferred by the human eye. The phase detection process by phase mechanism 110 may be referred to as auto phase detection or automatic phase detection (APD) or APD process throughout this document. However, it is to be contemplated that the use of the term "APD" or any of the aforementioned corresponding terms should not be read to limit embodiments to device, hardware, software, etc., that carry that label in products or in literature external to this document.

For example, conventional mechanism provide image qualities that are computer-guessed because they do not take into consideration the working or preference of the human eye, such as what qualities or factors, such as the level of sharpness or the amount of stability, etc., might appeal to humans (also referred to as "users", "end-users", "viewers", etc.). It is contemplated that different phase configuration results in different display quality, such as at good phases, displays are clear and sharp, while at bad phases, displays are blurry and dark. Similarly, some phases may have significant noise such as horizontal flashing stripes which may be visually annoying to users. Phase performances may vary according to their source, platform, format, etc., and therefore, identify the best performing phase is cumbersome, particularly in a complex media environment. Embodiments provide a comprehensive solution that is accurate, cost-efficient, resource-efficient, fast, relatively simple, and having strong jitter tolerance, etc. The solution, in one embodiment, is based on the known information about human vision perceptions and using that information, which can be obtained from any number of reports put forth by the scientific and medical community, a more appropriate phase is determined and chosen so that resulting image quality is pleasing to the human eye and is regarded as high quality by users (such as in terms of its sharpness, stability, pixel distribution, etc.).

As will be further described with reference to FIG. 2A, once the APD process has started by phase mechanism 110, it moves phase position for a start position to an end position with a defined increment for each process within the larger process. In one embodiment, at each phase of the image, various factors (e.g., stability optimization, sharpness optimization, image consistency evaluation, image suitability evaluation, etc.) are calculated and/or determined evaluate the image suitability and/or quality that reflects, for example, display sharpness and stability. The collected information may then be compared across all phase locations and eventually a phase with the best characteristics is chosen. As aforementioned, in one embodiment, the best characteristics may be based on the well-known science of how the human vision perceives image qualities so that the selected phase facilitates the best image quality in terms of what a typical human eye would appreciate and enjoy. Further, to make the comparison fair so that an apple-to-apple comparison is pursued, as a pre-requisite, APD's input image, during detection time, may be made still and consistent and may have the image contain a certain amount of contrast to sufficiently stimulate phase performance functions.

Phase mechanism 110 may be triggered and used in an automatic mode or a manual mode where, for example, raw data relating to each phase location may be determined or calculated by various components, while results of such calculations may be provided by other components of phase mechanism 110 by maintaining a handshake between these components. In case of the automatic mode, to preserve system resources and achieve fast completion of the process, certain components may perform multiple functions, such as calculating both the raw data and sort phase candidates without involving other components. Furthermore, for debugging and/or post-process purposes, at both automatic and manual modes, raw data calculated relating to each phase candidate may be stored in a memory which may be accessed after the APD process is completed. Similarly, once APD is performed, the circuit may be turned off and the phase may stay as hardware or software select till the next APD process is triggered.

Figure 2A:
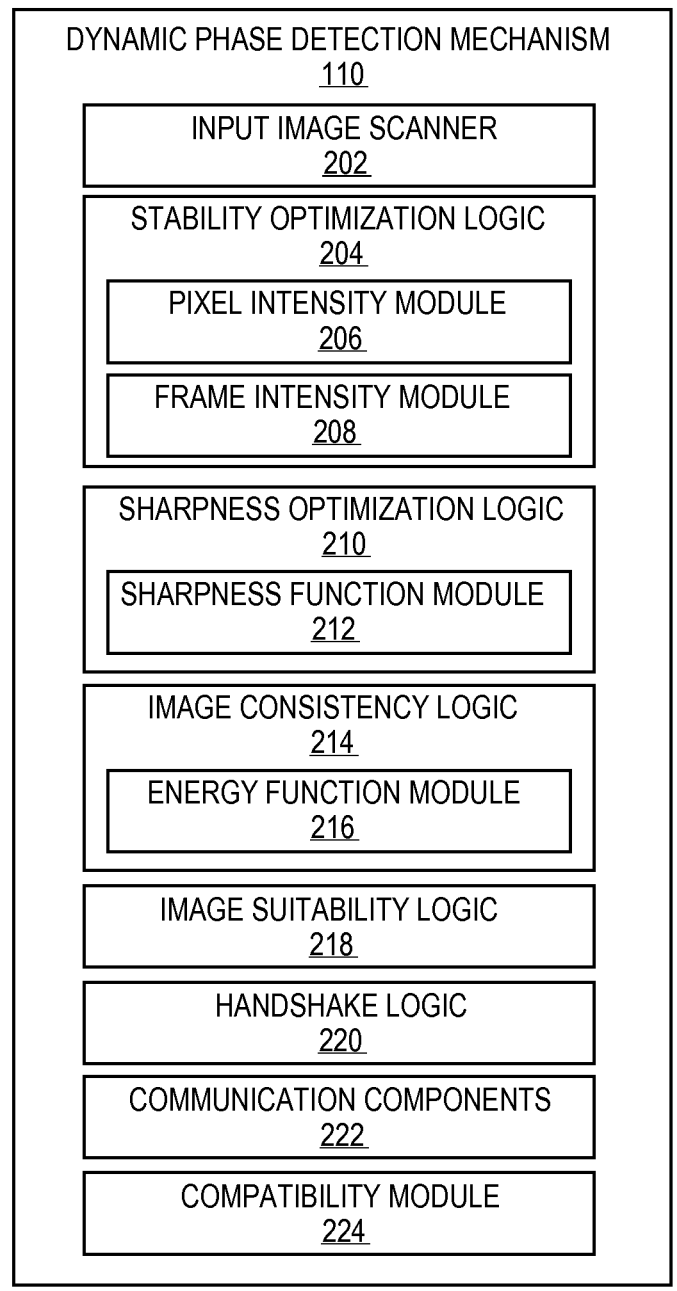
FIG. 2A illustrates dynamic phase detection mechanism according to one embodiment.

FIG. 2A illustrates dynamic phase detection mechanism 110 according to one embodiment. In one embodiment, phase mechanism 110 includes a number of components, such as input image scanner ("scanner") 202, stability optimization logic ("stability logic") 204 having pixel intensity module ("pixel module") 206 and frame intensity module ("frame module") 208, sharpness optimization logic ("sharpness logic") 210 having sharpness function module ("sharpness module") 212, image consistency evaluation logic ("consistency logic") 214 having energy function module ("energy module") 216, image suitability logic ("suitability logic") 218, handshake logic 220, communication components 222, and compatibility module 224. Throughout this document, various components 202-224 of phase mechanism 110 may be interchangeably referred to as "logic", "processing logic", or "module" and may include, by way of example, software, hardware, and/or any combination of software and hardware, such as firmware.

In one embodiment, scanner 202 may be used to scan the incoming images. Although embodiments are not limited to any particular image or type of image, certain conditions or criteria may be predetermined and applied for performing, for example, a more efficient processing for phase selection. For example, for a better apple-to-apple APD, a still image may be selected for phase examination. Further, a still image may be predetermined to contain some contrast, such as the selected image may not be a blank image or a solid-colored screened imaged or a grey-scaled image, etc. For example, as illustrated in FIG. 2B, an exemplary image 230 having repetitive vertical black and white lines of single-pixel-width may be regarded as an image with the best pattern to be selected to differentiate phase quality using phase mechanism 110.

Figure 2B:
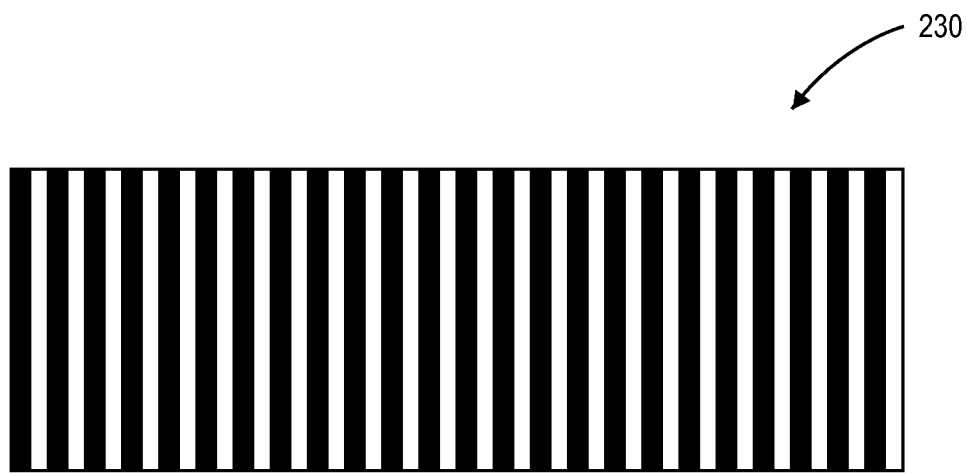
FIG. 2B illustrates an image pattern of an image selected for dynamic phase detection according to one embodiment.

In one embodiment, stability logic 204 facilitates determination and calculation of stability of the selected image, such as image 230 of FIG. 2B. For example, stability or stability function may be described as the statistic characterization of dot-to-dot difference between consecutive frames of the image on the same phase for each phase of the image. The more pixels are involved, the higher the accuracy is expected. It is contemplated that for an ideal solution, all dots for at least two consecutive frames may be compared and although such task may be performed using phase mechanism 110, for cost and time efficiency purposes, a small portion of dots with limited memory requirement may be selected for comparison purposes. As will be further described with reference to FIG. 2C, pixel intensity may be calculated using pixel module 206 and frame intensity may be calculated using frame module 208 to determine the stability function of the selected image.

Figure 2C:
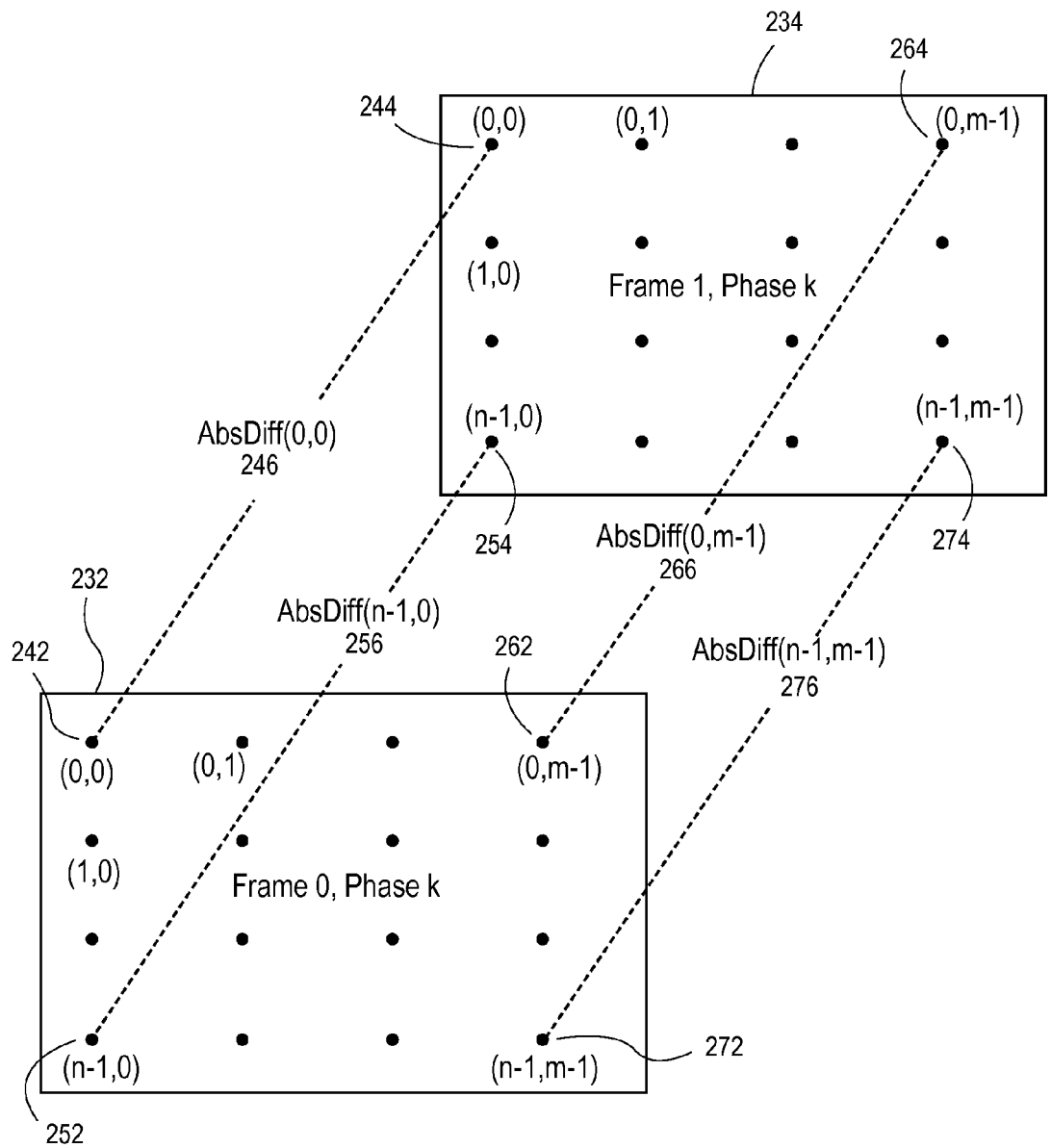
FIG. 2C illustrates dynamic phase detection according to one embodiment.

Referring now to FIG. 2C, a number of M×N pixels or pixel points of two consecutive frames 232, 234 of the selected image, such as image 230 of FIG. 2B, may be compared. For brevity and ease of understanding, frame 232 is considered frame 0 of phase k, while frame 234 is frame 1 of the same phase k. It is contemplated there may be 32 phases, such as ranging from k=0 thru k=31. For both frames 232, 234, a grid with dimension M×N may be defined having M pixels selected per line and N lines selected per frame. For each horizontally selected line, M pixels may be equally distributed, while for each vertically selected row, N pixels may be equally distributed. Both the horizontal direction and the vertical direction may be configurable, while randomness may be added, so that randomly selected M×N pixels may be used to statistically represent the whole frame 232, 234.

In the illustrated embodiment, 1024 pixels are chosen as the base (e.g., M×N=1024), where M and N are selectable as 2^X, X in a range of 0 to 10. Randomness may be achieved by, for example, two fixed Linear Feedback Shift Registers (LFSR), where one for horizontal randomness generation, for M pixels per line, and the other for vertical randomness generation, for N lines per picture. Their seeds are random (e.g., randomness may be tied to machine time), but for each APD calculation, identical seeds or pixels 242, 244, 252, 254, 262, 264, 272, 274—may be selected for phase candidates. The seeds may be needed at the start of each frame and once LFSR is loaded with the seeds, they may operate as defined by the polynomials. Further, it is to be noted that for pixels 242, 244, 252, 254, 262, 264, 272 and 274, but that their locations may be fixed for each APD calculation. When randomness is applied, certain location variation may be placed on top of the fixed M×N grid. The location variation may be pseudo-random and mathematically predictable due to pre-defined polynomial and seeds, which may make the selected pixels' locations 242, 244, 252, 254, 262, 264, 272, 274 repeatable from frame 232 to frame 234. This way frame statistics relating to frames 232 and 234 may be obtained, but without having to incur any frame buffer cost.

Once M×N random grid is decided, their individual intensity difference may be collected and overall intensity variation may be characterized from the initial phase location (e.g., phase k=0) to the ending phase location (e.g., phase k=31). It is contemplated that the better the phase in terms of the PLL jitter tolerance performance, the lower the overall intensity difference as calculated by pixel module 206 and frame module 208 that is then used to calculate stability optimization as provided by stability logic 204.

For example, pixel (0,0) 242 of frame 232 may be selected and compared to its counterpart pixel (0,0) 244 of frame 234 so the pixel intensity difference (AbsDiff(0,0)) 246 for pixels 242, 246 may be calculated using pixel module 206 using, for example, the following equation:

AbsDiff$(i,j,k)$=|P$(i,j,k,0)$−P$(i,j,k,1)$|,0≤$i$<n,0≤$j$<m, 0≤$k$<32.

Similarly, the aforementioned equation may be used by pixel module 206 to calculate pixel intensity differences AbsDiff(n−1,0) 256, AbsDiff(0, m−1) 266, AbsDiff(n−1,m−1) 276 for other corresponding pixels 252, 254, 262, 264, 272, 274. Once the pixel intensity differences 246, 256, 266, 276 have been calculated, frame module 208 may be used to calculate the frame intensity difference (AbsDiffTotal(k)) using, for example, the following equation:

$$AbsDiffTotal(k) = \sum_{i=0}^{n-1}\sum_{j=0}^{m-1} AbsDiff(i, j, k), 0 \le k < 32.$$

Once the frame intensity difference have been calculated, stability logic 204 may then use the frame intensity difference calculation to generate the stability optimization for each phase using, for example, the following equation: Minimize (AbsDiffotal(k)),0≤k<32. Further, based on the criteria set forth by the aforementioned equations, the various phase candidates may be internally sorted out so that the best phase may be selected. This emulation platform demonstrates the effectiveness of stability optimization of phases and it is contemplated that for images with large amounts of pixel-to-pixel transitions, a stronger jitter tolerance may be achieved by phase mechanism 110.

In one embodiment, since clock and phase may be highly relevant to high frequency signals and not so relevant to low frequency signals, sharpness optimization may be generated using sharpness logic 210. For example and in some embodiments, sharpness logic 210 may use high frequency component energy (HFCE) to calculate sharpness optimization of phases. The following equation defines HFCE and may be used by sharpness function module 212 to obtain a sharpness function (HFCE(k)) for any number of phase candidates:

if (| −p$_{i,j-1}$' + 2 * p$_{i,j}$' − p$_{i,j+1}$' | > hf_threshold)
hfce$_{i,j}$ = | −p$_{i,j-1}$' + 2 * p$_{i,j}$' − p$_{i,j+1}$' |;
else
hfce$_{i,j}$ = 0;

$$HFCE(k) = \sum_{i=0}^{H-1}\sum_{j=0}^{V-1} hfce_{i,j}, 0 \le k < 32.$$

Once the sharpness function is obtained, sharpness optimization logic 210 may use the available sharpness function to calculate sharpness optimization for various phases candidates using, for example, the following equation: Maxmize (HFCE(k)),0≤k<32. Where i and j represent line counter and column counter, respectively, for H×V image resolution. P$_{i,j}$ represents a pixel value, while hf_threshold represents a programmable register setting. Based on the criteria set forth by the aforementioned equations, the phase candidates are internally sorted out, while an image with fast pixel-to-pixel transition may generate a higher HFCE than the image with slow transition.

Further, if, due to asymmetric sharpness distribution across multiple phase candidates, the sharpest phase with the maximum HFCE is not the cleanest one (e.g., contains low-level, but noticeable noise that can makes display not as quiet as expected), a cleaning process may be performed after the phase sorting to make ensure that the selected phase candidate falls into a relatively quiet neighborhood. This may represent a trade-off in-between image sharpness and neighborhood consistency.

Based on APD optimization criteria, to sweep through all phase candidates, it may take approximately one second for the calculation process to conclude. However, during this calculation, the selected image may change abruptly and APD's assumption relating to a still image may also be in danger of changing. To avoid or fix such cases, image consistency of the image is monitored using consistency logic 214, based on energy function determined by energy module 216, during the phase detection process. The base energy function may be calculated or approximated by the sum pixel values using energy module 216 and, for example, the following equation:

$$afce = \sum_i \sum_j p_{i,j},$$

where afce stands for All Frequency Component Energy (AFCE), i and j represent line counter and column counter, respectively. In general, for each APD calculation, if the input image remains still, the distribution range of AFCE may be relatively small. If, for example, the distribution is too wide compared to a particular threshold (e.g., a predefined threshold), it would imply an abrupt input image change and thus the image may be deemed inconsistent. The distribution may be normalized and measured by, for example, the following equation: [Max(AFCE)−Min(AFCE)]/Max(AFCE), where Max(AFCE) and Min(AFCE) stand for maximum AFCE and minimum AFCE, respectively during the same APD calculation. Further, using consistency logic 214, the threshold may be controlled by a register (e.g., reg_csst_thresh[1:0]), while the consistency may be reflected by a register bit (e.g., reg_apd_img_csst).

In one embodiment, image suitability logic 218 may be used to examine the edge intensiveness of the selected image. If the number of edges is equal to or more than a particular (e.g., predefined) threshold, the image may be deemed suitable; in contrast, if the number of edges is less than the threshold, the image may be determined as unsuitable. Using suitability logic 218, the threshold may be controlled by a register (e.g., reg_edg_thresh[1:0]), while the suitability may be reflected by a register bit (e.g., reg_apd_img_suitable).

Based on the condition that the image is still (as determined from image consistency evaluation as obtained by image consistency logic 214) and suitable (as determined from image suitability evaluation as obtained by image suitability logic 218) for phase detection, the best phase candidates is decided by both sharpness optimization (as obtained using sharpness optimization logic 210) and stability optimization (as obtained using stability optimization logic 204). In one embodiment, the best phase is selected as it may correspond to the highest levels of stability and the sharpness.

In one embodiment, in case of any conflict between the stability and the sharpness, if the image under testing has a large amount of pixel-to-pixel transitions and is jitter-sensitive (e.g., gray_11 pattern), stability optimization of the phase may be favored over sharpness optimization to ensure jitter tolerance which may be regarded as more important than other factors. In contrast, for images with fewer pixel-to-pixel transitions or those that are less sensitive to jitter, sharpness optimization may be preferred and applied. In other words, an ideal phase would be the one with best stability and sharpness levels that is strong in jitter tolerance so the best possible image may be provided to the user, but in cases where the APD process may have to negotiate between stability and sharpness, the best selected phase may correspond to the an image that is selected from the best neighborhood of images (as may be seen on a graph) that provides the strongest correlation with the known human vision perspectives.

Furthermore, in one embodiment, handshake logic 220 may be used to facilitate a handshake between various processes or components of phase mechanism 110. For example, an interrupt associated with a current phase may be generated here, while various components of phase mechanism 100 may collect the relevant data and once the process is completed, the interrupt will be cleared and the state may transition to another process.

Communication components 222 may be used to facilitate communication between various media devices, such as source devices, sink devices, intermediate devices/analog-digital convertors, etc., of different bands, makes, versions, mechanisms, etc. Communication components 222 further provide various modules to facilitate communication between various components 202-224 of phase mechanism 110 as well as with and through certain default communication components (such as receivers, transmitters, analog-digital convertors, audio-video convertors, processors, loud speakers, I/O components, buffers, and the like) that may be part of various media devices. Similarly, compatibility module 224 facilitates compatibility between media devices, such as source devices, sink devices, intermediate devices/analog-digital convertors, etc., of different bands, makes, versions, mechanisms, etc., and is not limited to any particular number or type of media devices, technology, components, standards, audio/video formats, audio and video signal types, hardware, connections, software, equipment, such as displays, wires, connections, etc., or the like. It is to be noted and appreciated that any reference to "television" or other similar media devices is made as an example to promote brevity, clarity and ease of understanding and that embodiments of the invention are not limited to a particular type, brand, or number of media devices and/or their components.

Figure 3:
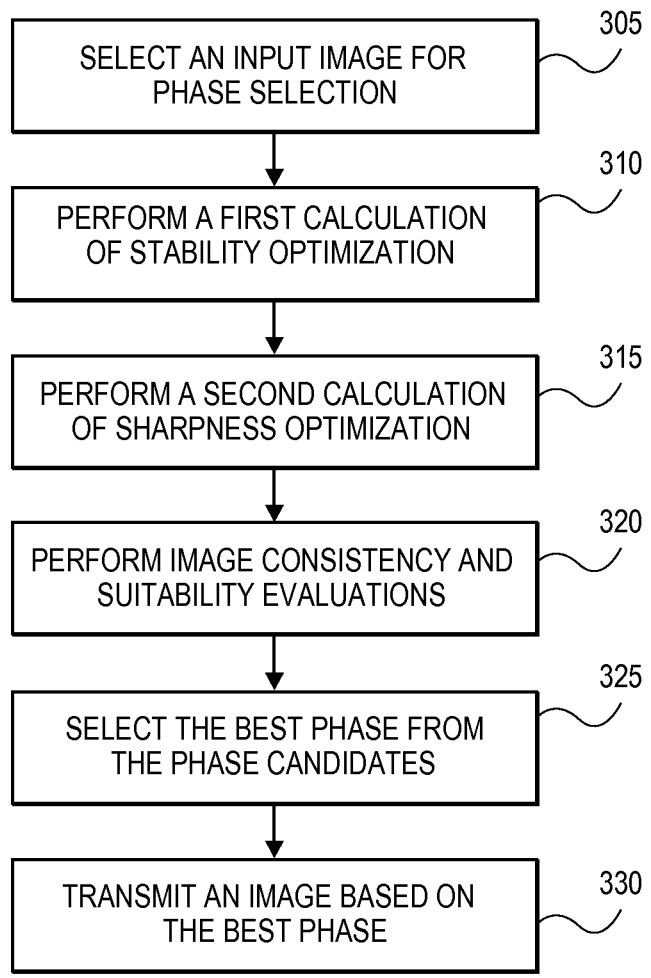
FIG. 3 illustrates a method for dynamic phase detection according to one embodiment.

FIG. 3 illustrates a method for dynamic phase detection according to one embodiment. Method 300 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 300 is performed by dynamic phase detection mechanism 110 of FIG. 1.

Method 300 starts at block 305 where an image from a number and type of input images is selected for selection of the best phase to represent the image. At block 310, a first calculation is performed to determine stability optimization with regard to each phase of the image by testing various pixel points on consecutive frames of each phase of the selected image. At block 315, a second calculation is performed to determine sharpness optimization At block 320, image consistency evaluation and suitability evaluations are performed. In one embodiment, image consistency and suitability evaluation are independent of stability and sharpness optimizations, while consistency and suitability evaluations may determine whether APD optimization is valid and applicable at a higher system level. If an image is determined to be inconsistent or unsuitable, any APD optimization results may be ignored. At 325, in one embodiment, using the aforementioned calculations for determining stability, sharpness, consistency evaluation, and suitability evaluation, the best phase is selected. It is contemplated that the selected image may not necessarily be the best at each of the stability or sharpness, but it may be from the best neighborhood of all images where certain compromises may be made to some of the factors, such as stability over sharpness or vice versa, etc. At block 330, the image is transmitted to be viewed by users via a display device. The display device (e.g., display screen) may be coupled to or be part of a sink device (e.g., television, computing device) to display the image based on the best phase. In one embodiment, the selected best phase represents a phase the provides or displays the image in the best possible manner that has strong jitter tolerance and is in accordance with the already-known human vision perceptions so the user may appreciate and enjoy the image at the highest level and in a natural manner.

Figure 4:
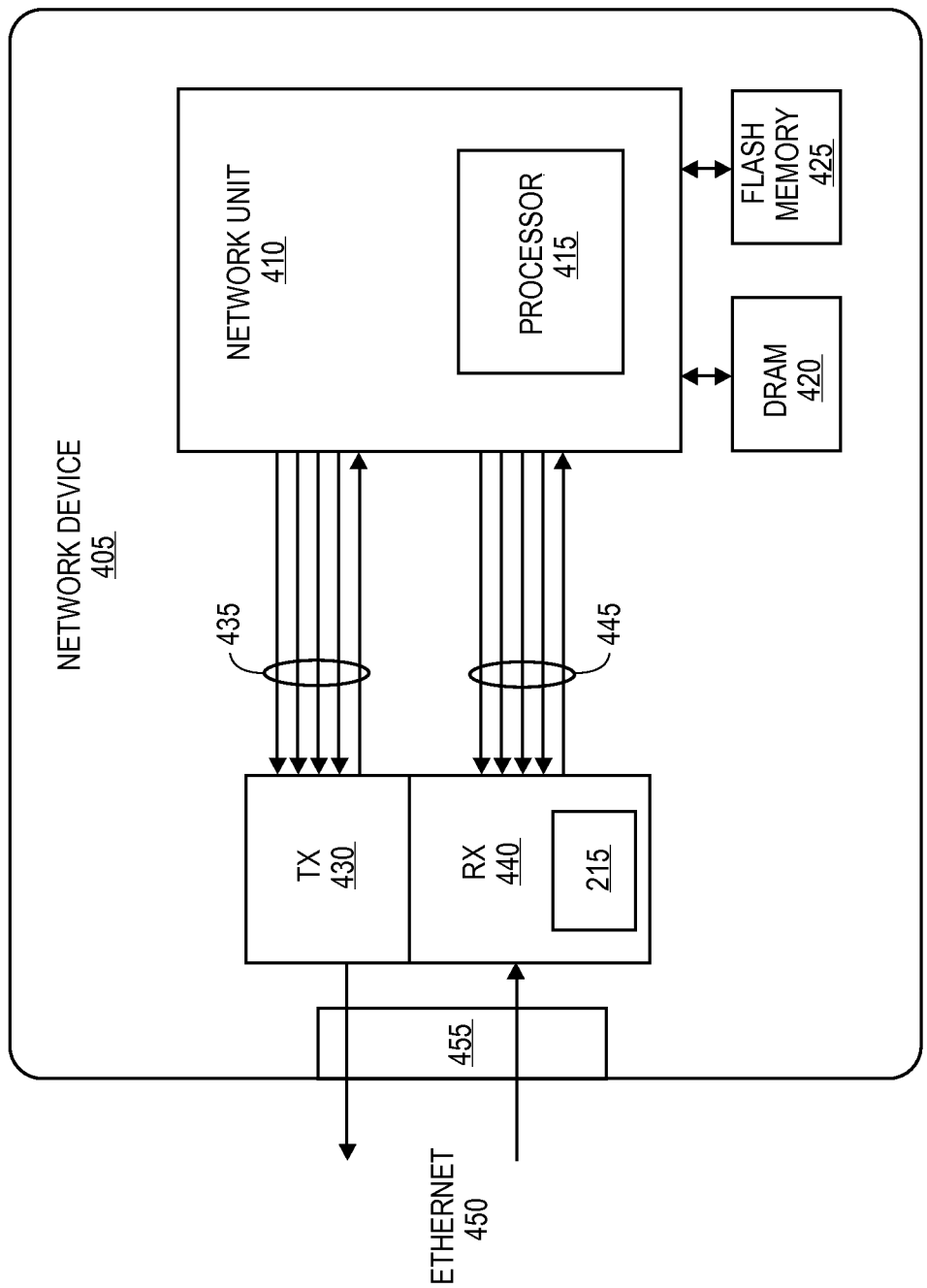
FIG. 4 illustrates a computing device capable of employing one or more embodiments.

FIG. 4 illustrates components of a network computer device 405 employing dynamic phase detection mechanism 110 of FIG. 1 according to one embodiment. In this illustration, a network device 405 may be any device in a network, including, but not limited to, a computing device, a network computing system, a television, a cable set-top box, a radio, a Blu-ray player, a DVD player, a CD player, an amplifier, an audio/video receiver, a smartphone, a Personal Digital Assistant (PGA), a storage unit, a game console, or other media device. In some embodiments, the network device 405 includes a network unit 410 to provide network functions. The network functions include, but are not limited to, the generation, transfer, storage, and reception of media content streams. The network unit 410 may be implemented as a single system on a chip (SoC) or as multiple components.

In some embodiments, the network unit 410 includes a processor for the processing of data. The processing of data may include the generation of media data streams, the manipulation of media data streams in transfer or storage, and the decrypting and decoding of media data streams for usage. The network device may also include memory to support network operations, such as Dynamic Random Access Memory (DRAM) 420 or other similar memory and flash memory 425 or other nonvolatile memory. Network device 405 also may include a read only memory (ROM) and or other static storage device for storing static information and instructions used by processor 415.

A data storage device, such as a magnetic disk or optical disc and its corresponding drive, may also be coupled to network device 405 for storing information and instructions. Network device 405 may also be coupled to an input/output (I/O) bus via an I/O interface. A plurality of I/O devices may be coupled to I/O bus, including a display device, an input device (e.g., an alphanumeric input device and or a cursor control device). Network device 405 may include or be coupled to a communication device for accessing other computers (servers or clients) via external data network. The communication device may comprise a modem, a network interface card, or other well-known interface device, such as those used for coupling to Ethernet, token ring, or other types of networks.

Network device 405 may also include a transmitter 430 and/or a receiver 440 for transmission of data on the network or the reception of data from the network, respectively, via one or more network interfaces 455. Network Device 405 may be the same as the communication media device 100 of FIG. 1 employing phase mechanism 110 of FIG. 1. The transmitter 430 or receiver 440 may be connected to a wired transmission cable, including, for example, an Ethernet cable 450, a coaxial cable, or to a wireless unit. The transmitter 430 or receiver 440 may be coupled with one or more lines, such as lines 435 for data transmission and lines 445 for data reception, to the network unit 410 for data transfer and control signals. Additional connections may also be present. The network device 405 also may include numerous components for media operation of the device, which are not illustrated here.

Network device 405 may be interconnected in a client/server network system or a communication media network (such as satellite or cable broadcasting). A network may include a communication network, a telecommunication network, a Local Area Network (LAN), Wide Area Network (WAN), Metropolitan Area Network (MAN), a Personal Area Network (PAN), an intranet, the Internet, etc. It is contemplated that there may be any number of devices connected via the network. A device may transfer data streams, such as streaming media data, to other devices in the network system via a number of standard and non-standard protocols.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs which are not illustrated or described.

Various embodiments of the present invention may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

One or more modules, components, or elements described throughout this document, such as the ones shown within or associated with an embodiment of a DRAM enhancement mechanism may include hardware, software, and/or a combination thereof. In a case where a module includes software, the software data, instructions, and/or configuration may be provided via an article of manufacture by a machine/electronic device/hardware. An article of manufacture may include a machine accessible/readable medium having content to provide instructions, data, etc.

Portions of various embodiments of the present invention may be provided as a computer program product, which may include a computer-readable medium having stored thereon computer program instructions, which may be used to program a computer (or other electronic devices) to perform a process according to the embodiments of the present invention. The machine-readable medium may include, but is not limited to, floppy diskettes, optical disks, compact disk read-only memory (CD-ROM), and magneto-optical disks, read-only memory (ROM), random access memory (RAM), erasable programmable read-only memory (EPROM), EEPROM, magnet or optical cards, flash memory, or other type of media/machine-readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. An apparatus comprising:
 a media device comprising
 a first logic to generate a first stability optimization of an image of a media stream across two or more consecutive image frames at a first clock phase, and to generate a second stability optimization across the two or more consecutive image frames at a second clock phase;
 a second logic to generate a first sharpness optimization of the image at the first clock phase and a second sharpness optimization of the image at the second clock phase; and
 a third logic to select a phase from between at least the first clock phase or the second clock phase based on the first stability optimization, the second stability optimization, the first sharpness optimization, and the second sharpness optimization, wherein the selected clock phase facilitates analog to digital conversion of the media stream.

2. The apparatus of claim 1, wherein the third logic further scans and selects the image from a plurality of images in the media stream, wherein the selected image represents an ideal image to be analyzed for selection between at least the first clock phase or the second clock phase based on predetermined criteria.

3. The apparatus of claim 1, further comprising:
 a fourth logic to evaluate image consistency; and
 a fifth logic to evaluate image suitability.

4. The apparatus of claim 1, further comprising a display device coupled to the media device, the display device to display the image based on the selected clock phase, wherein the media device includes an intermediate device including a media format convertor to convert the media stream from analog to digital or from digital to analog, wherein the media stream includes an audio/video media stream.

5. The apparatus of claim 4, wherein the media device comprises a source device coupled to the sink device over a network, the source device to generate the audio/video data stream, wherein the media device includes a network computing system, a cable set-top box, a cable headend, a satellite broadcasting system, a Blu-ray players, and a DVD players.

6. The apparatus of claim 1, wherein the first logic generates the first stability optimization and the second stability optimization from a randomly selected subset of pixels in the image.

7. The apparatus of claim 1, wherein the second logic generates the first sharpness optimization and the second sharpness optimization based on high frequency component energy of the image.

8. A system comprising:
 a computing device comprising a memory to store instructions, and a media device to execute the instructions, wherein the instructions cause the media device to:
 generate a first stability optimization of an image of a media stream across two or more consecutive image frames at a first clock phase and a second stability optimization across the two or more consecutive image frames at a second clock phase;
 generate a first sharpness optimization of the image at the first clock phase and a second sharpness optimization of the image at the second clock phase; and
 select a phase from between at least the first clock phase or the second clock phase based on the first stability optimization, the second stability optimization, the first sharpness optimization, and the second sharpness optimization, wherein the selected clock phase facilitates analog to digital conversion of the media stream.

9. The system of claim 8, wherein the media device further scans and selects the image from a plurality of images in the media stream, wherein the selected image represents an ideal image to be analyzed for selection between at least the first clock phase or the second clock phase based on predetermined criteria.

10. The system of claim 8, wherein the instructions cause the media device to further:
 evaluate image consistency; and
 evaluate image suitability.

11. The system of claim 8, further comprising a display device coupled to the media device, the display device to display the image based on the selected clock phase, wherein the media device includes an intermediate device including a media format convertor to convert the media stream from analog to digital or from digital to analog, wherein the media stream includes an audio/video media stream.

12. The system of claim 11, wherein the media device comprises a source device coupled to the sink device over a network, the source device to generate the audio/video data stream, wherein the media device includes a network computing system, a cable set-top box, a cable headend, a satellite broadcasting system, a Blu-ray players, and a DVD players.

13. The system of claim 8, wherein the instructions cause the media device to generate the first stability optimization and the second stability optimization from a randomly selected subset of pixels in the image.

14. The system of claim 8, wherein the the instructions cause the media device to generate the first sharpness optimization and the second sharpness optimization based on high frequency component energy of the image.

15. A method comprising:
 generating, at a media device, a first stability optimization of an image of a media stream across two or more consecutive image frames at a first clock phase and a second stability optimization across the two or more consecutive image frames at a second clock phase;

generating a first sharpness optimization of the image at the first clock phase and a second sharpness optimization of the image at the second clock phase; and selecting a phase from between at least the first clock phase or the second clock phase based on the first stability optimization, the second stability optimization, the first sharpness optimization, and the second sharpness optimization, wherein the selected clock phase facilitates analog to digital conversion of the media stream.

16. The method of claim 15, further comprising scanning and selecting the image from a plurality of images in the media stream, wherein the selected image represents an ideal image to be analyzed for selection between at least the first clock phase or the second clock phase based on predetermined criteria.

17. The method of claim 15, further comprising:
evaluating image consistency; and
evaluating image suitability.

18. The method of claim 15, further comprising displaying, via a display device coupled to the media device, the image based on the selected clock phase, wherein the media device includes an intermediate device including a media format convertor to convert the media stream from analog to digital or from digital to analog, wherein the media stream includes an audio/video media stream.

19. The method of claim 15, wherein the the first stability optimization and the second stability optimization are generated from a randomly selected subset of pixels in the image.

20. The method of claim 15, wherein the first sharpness optimization and the second sharpness optimization are generated based on high frequency component energy of the image.

\* \* \* \* \*